(12) United States Patent
Koch

(10) Patent No.: US 7,735,585 B2
(45) Date of Patent: Jun. 15, 2010

(54) HARD MATERIAL INSERT FOR A DRILL AND A DRILL WITH THE HARD MATERIAL INSERT

(75) Inventor: Olaf Koch, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 278 days.

(21) Appl. No.: 11/894,499

(22) Filed: Aug. 20, 2007

(65) Prior Publication Data

US 2008/0047759 A1 Feb. 28, 2008

(30) Foreign Application Priority Data

Aug. 21, 2006 (DE) ........................ 10 2006 000 410

(51) Int. Cl.
*E21B 10/58* (2006.01)
*E21B 10/46* (2006.01)

(52) U.S. Cl. ...................................... 175/426; 175/425

(58) Field of Classification Search ................... 175/425, 175/426, 419
See application file for complete search history.

(56) References Cited

U.S. PATENT DOCUMENTS

| 6,817,429 B2 * | 11/2004 | Sollami | 175/420.1 |
| 2006/0243496 A1 * | 11/2006 | Widmann | 175/426 |

\* cited by examiner

*Primary Examiner*—David J Bagnell
*Assistant Examiner*—James G. Sayre
(74) *Attorney, Agent, or Firm*—Abelman, Frayne & Schwab

(57) ABSTRACT

A hard material insert (1) for a drill (2, 2') includes an axially central reinforcement (3) provided in the insert, and two diametrically opposite, radial arms (4) each having a cross-section tapering radially outwardly, opposite free side (8) and connection side (7), with the free and connection sides (8, 7) of one of the radial arms (4) being arranged alternatively to the free and connection sides of another of the radial arms (4), and a concave recess (6) provided on the connection side (7).

10 Claims, 1 Drawing Sheet

HARD MATERIAL INSERT FOR A DRILL AND A DRILL WITH THE HARD MATERIAL INSERT

BACKGROUND OF THE INVENTION

1. Field of the Invention

The present invention relates to a hard material insert for a drill and, in particular, a drill for drilling in a reinforced concrete, and to a drill with such an insert.

2. Description of the Prior Art

The problem with the drills of the type discussed above consists in that they should meet contradictory requirements. On one hand, the drills should be formed sufficiently hard for removal of a brittle stone material. On the other hand, the drills should be formed sufficiently ductile to insure their robustness upon encounter with concrete reinforcement. Together with the selection of a corresponding material, the shape of the hard material insert assumes a particular importance in this regard, with at least one aspect consisting in the optimization of the manufacturing process during which a material-locking connection of the hard material insert with a drilling head of a drill should be effected at narrowly limited optimal conditions in order, e.g., to minimize temperature-induced latent stresses and unbalances.

U.S. Pat. No. 5,287,937 or European Publication EP 790387 discloses a mirror-symmetrical, plate-shaped hard material insert with two opposite radial arms on which cutting edges are formed, and with a central reinforcement in form of a segment of a cylinder. The insert is self-adjustable upon being brazed in the drill head.

U.S. Pat. No. 3,447,616 discloses a plate-shaped hard material insert with a central reinforcement in form of a segment of a cylinder and that does not extend over the entire axial length.

German Publications DE 196 50 487 and DE 197 24 373 disclose a compact prismatic hard material insert with an X-shaped cross-section.

U.S. Design Patent No. 515,116 S discloses a hard material insert for a drill having in its cross-section extending transverse to a rotational axis of the drill, an axially central reinforcement, and two diametrically opposite, radial arms each having a cross-section tapering radially outwardly, opposite free side and connection side, with the free and connection sides of one of the radial arms being arranged alternatively with respect to the free and connection sides of another of the radial arms.

An object of the present invention is to provide a hard material insert for a drill and suitable for mass production.

Another object of the present invention is to provide a hard material insert optimal for drilling in a reinforced concrete.

SUMMARY OF THE INVENTION

These and other objects of the present invention, which will become apparent hereinafter, are achieved by providing a hard material insert for a drill having, in its cross-section extending transverse to a rotational axis of the drill, an axially central reinforcement, and two diametrically opposite, radial arms each having a cross-section tapering radially outwardly, opposite free side and connection side, with the free and connection sides of one of the radial arms being arranged alternatively with respect to the free and connection sides of another of the radial arms, and a concave recess provided on the connection side.

The concave recess, which is provided on the connection side remote with respect to the rotational direction of the radial arm, insures that the associated drilling head or shaft, which is adapted for a formlocking engagement with the insert, is tangentially reinforced in the rotational direction, whereas the central reinforcement insures a co-axial self-centering of the hard material insert upon connection of the insert with the shaft or the drilling head.

Advantageously, the insert is formed as a dual rotationally symmetrical body, which provides for the adaptation of the insert to a two-lead or four-lead symmetrical drill spiral.

Advantageously in an axial cross-section, the connection side of the radial arm extends linearly. Thereby, the respective section of the recess in the drilling head can be technologically favorably formed, e.g., by slot milling or formed with a milling disc cutter.

Advantageously, in an axial cross-section, the free side of the radial arm forms a straight line and passes tangentially into the central reinforcement. As a result, because of symmetry, with an appropriate use, no local stress maxima can occur.

Advantageously, in an axial cross-section, the central reinforcement is at least partially arcuate. Thereby, a respective section of the associated recess is technologically favorably formed by an axial drilling, e.g., is formed with an end milling cutter.

Advantageously, the transition from the central reinforcement to the connectional side of a radial arm is formed (mathematically smooth, i.e., without sharp points, so that no notch stresses are produced which could have reduced the fatigue strength or the high-stressed hard material insert.

Advantageously, the transition has a curvature radius greater than one-twentieth of a diametrical length of the insert. Thereby, with an appropriate use, the generated stresses remain within allowable strength limits.

Advantageously, the insert forms at its axial end side, a main cutter extending over both radial arms, whereas within the central reinforcement region, advantageously, an auxiliary cutter that extends transverse to the main cutter, is formed. This increases stiffness of the insert upon encountering of a reinforcement of concrete.

Advantageously, the insert is received in a recess formed in the drill and is connected with the drill in a material-locking manner. The connection is effected advantageously by brazing, which provides a drill optimized for use for drilling in a reinforced concrete.

Advantageously, the insert, when secured in the drilling head or the drill shaft, lies free on the free side of the radial arm. This insures that the correspondingly formed recess would not have any radial undercut and can be easily technologically formed by slot milling or with a milling disc cutter.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiments, when read with reference to the accompanying drawings.

DETAILED DESCRIPTION OF THE PREFERRED EMBODIMENT

A dual rotationally symmetrical hard material insert 1 according to the present invention of rotary-percussion drill 2

Figure 1:
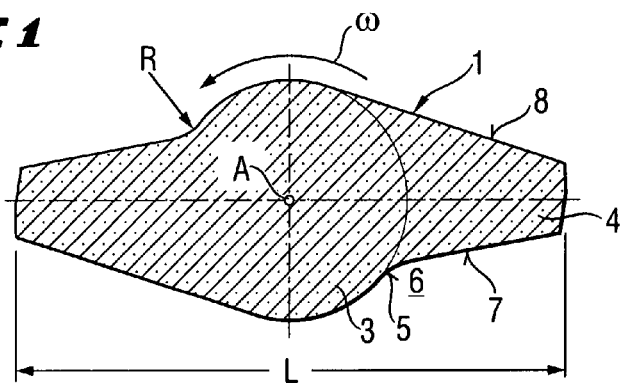
FIG. 1 a cross-sectional view of a hard material insert according to the present invention.

(FIG. 2), which rotates in a rotational direction ω about an axis A, has, as shown in FIG. 1, an axial central reinforcement 3 and two opposite, taping radially outwardly, radial arms 4. The radial arms 4 have each only one connection sides, which connects positively the radial arms 4 with the central reinforcement 3, remote with respect to the rotational direction ω, namely, the connection side 7, a concave recess 6 that runs as a straight line. The free side 8 of the radial arm 4, adjacent to the rotational direction ω, also runs as a straight line and tangentially passes into the central reinforcement 3 that is partially arcuate. The transition 5 from the central reinforcement 3 to the connection side 7 of the radial arm 4 is smooth, with a curvature radius R of a tenth of the diametric length L of the hard material insert 1.

Figure 2:
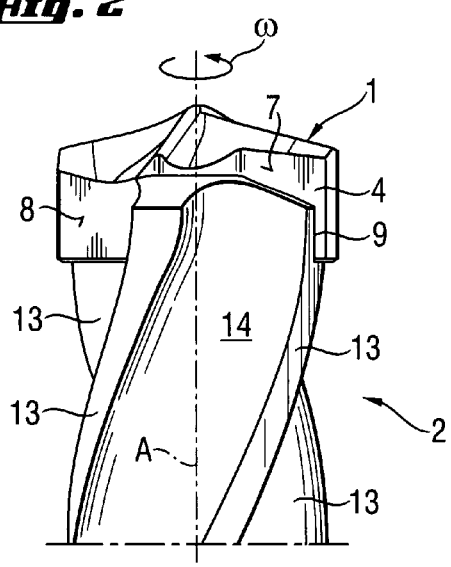
FIG. 2 a side view of a drill with the insert shown in FIG. 1.
Figure 3:
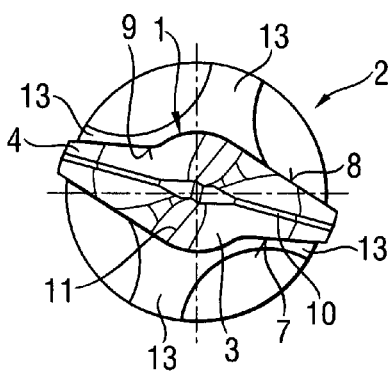
FIG. 3 a plan view of the drill.

In FIGS. 2-3, the hard material insert 1 is received in a recess 9 of the drill 2 and which is formed in the axially cut-off shaft 14 having four spiral leads. The insert 1 is material-lockingly brazed to the shaft 14 at the connection side 7. At its free side 8, which is adjacent to the rotational direction ω, the radial arm 4 lies freely. The hard material insert 1 forms, at an axial end side thereof, a main cutter 10 extending over the radial arms 4, and within the central reinforcement 3, an auxiliary or minor cutter 11 that extends transverse to the main cutter 10.

Figure 4:
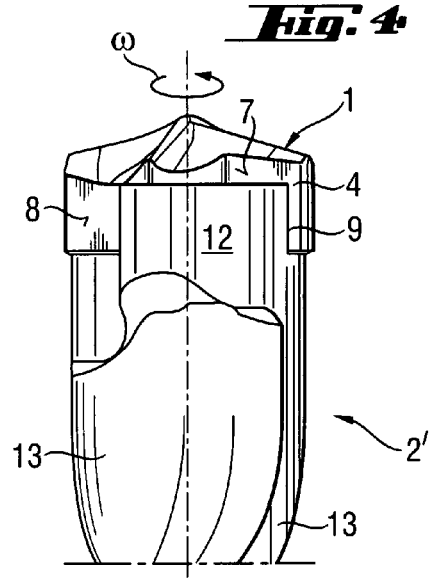
FIG. 4 a side view of another embodiment of a drill with the insert shown in FIG. 1.
Figure 5:
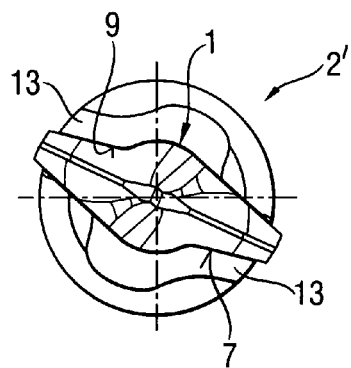
FIG. 5 a plan view of the drill shown in FIG. 4.

According to FIGS. 4 and 5, the hard material insert 1 is arranged in a recess 9 of a mounted drilling head 12 of a drill 2'. The drill 2' has two spiral leads 13 and is brazed with the hard material insert 1 on the connection side 7 of the insert radial arm 4, with the hard material insert 1 lying freely at the free side 8 of the radial arm 4 and adjacent to the rotational direction ω.

Though the present invention was shown and described with references to the preferred embodiment, such is merely illustrative of the present invention and is not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A hard material insert (1) for a drill (2, 2'), comprising in a cross-section thereof extending transverse to a rotational axis (A) of the drill (2, 2'), an axially central reinforcement (3); and two diametrically opposite, radial arms (4) each having a cross-section tapering radially outwardly, opposite free side (8) and connection side (7), the free side (8) of the radial arm (4) forming in an axial cross-section a straight line and passing tangentially into the central reinforcement, the free and connection sides (8, 7) of one of the radial arms (4) being arranged alternatively to the free and connection sides of another of the radial arms (4), with a concave recess (6) provided on the connection side (7).

2. A hard material insert according to claim 1, wherein the insert is formed as a dual, rotationally symmetrical body.

3. A hard material insert according to claim 1, wherein in an axial cross-section, the connection side (7) of the radial arm (4) forms a straight line.

4. A hard material insert according to claim 1, wherein in an axial cross-section, the central reinforcement (3) is at least partially arcuate.

5. A hard material insert according to claim 1, comprising a smooth transition (5) between the central reinforcement and the connection side of the radial arm (4).

6. A hard material insert according to claim 5, wherein the transition (5) has a curvature radius greater than one-twentieth R of a diametrical length (L) of the insert (1).

7. A hard material insert according to claim 1, wherein the insert forms at an axial end side thereof, a main cutter (10) extending over both radial arms (4) and within the central reinforcement (3), an auxiliary cutter (11) that extends transverse to the main cutter (10).

8. A hard material insert according to claim 1, wherein the insert is received in a recess (9) formed in the drill and is connected with the drill in a material-locking manner.

9. A hard material insert according to claim 8, wherein the insert lies free on the free side (8) of the radial arm (4).

10. A drill, comprising a body (12, 14) having a recess (9); and a hard material insert (1) securable in the recess (9) and having in a cross-section thereof extending transverse to a rotational axis (A) of the drill (2, 2'), an axially central reinforcement (3); and two diametrically opposite, radial arms (4) each having a cross-section tapering radially outwardly, opposite free side (8) and connection side (7), with the free side (8) of the radial arm (4) forming a straight line and passes tangentially into the central reinforcement in an axial cross-section.

* * * * *